July 14, 1942.  LE CONIE STILES  2,289,388
ART OF SHEETING DOUGH
Filed Oct. 22, 1940
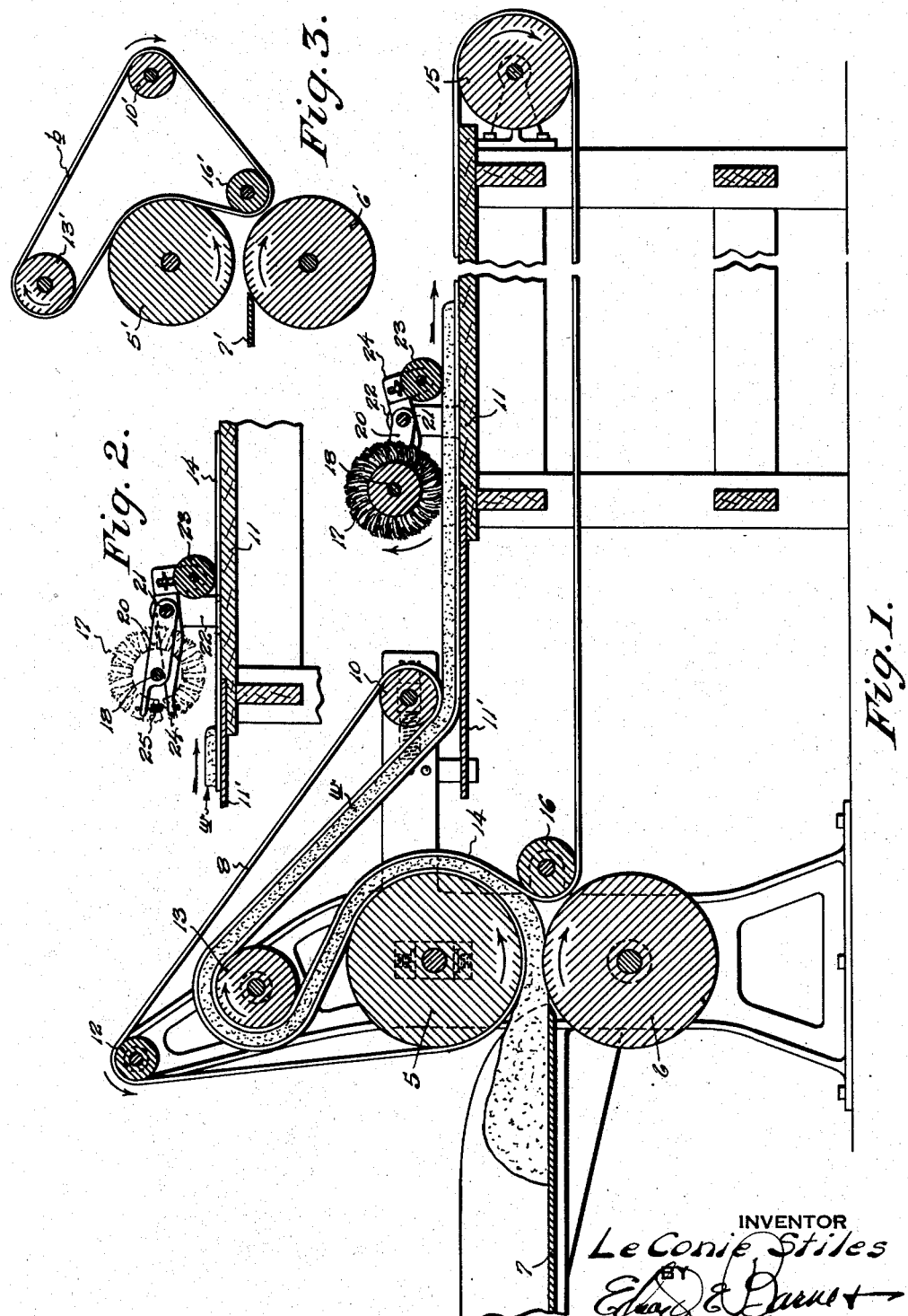
INVENTOR
Le Conie Stiles
BY
ATTORNEY Patented July 14, 1942

2,289,388

UNITED STATES PATENT OFFICE 2,289,388

ART OF SHEETING DOUGH

Le Conie Stiles, Seattle, Wash.

Application October 22, 1940, Serial No. 362,222

5 Claims. (Cl. 107—12)

This invention relates to the art of sheeting dough, and its object is to provide a machine performing its sheeting office by the act of initially passing the dough between complementing pressure rolls and thence passing the same between a pair of paralleling belts the mounting of which is such that a continuing compression pressure is applied to the dough throughout a time interval sufficient to adjust the dough to its sheeted form. As is well known, dough as used for bakery goods is highly elastic and its tendency following passage through the customary sheeting rolls is to revert by expansion to its original form, in consequence of which most sheeters require a severalty of roller assemblies to permit the dough to be fed successively therethrough. The principal objection of course resides in the fact of the successively used rollers, by their inflexible nature, tending to toughen the dough.

In accomplishing the foregoing object, namely feeding the dough in my machine from the sheeting rollers between the compression belts, I find that an appreciable amount of dry flour must be applied to the surface of the dough in order to preclude sticking, and it is a further and a particular object of my invention to provide a rotary brush for the removal of this applied flour, the brush being so mounted that the flour is removed in the travel of the sheeted dough over a receiving table therefor and in such a manner that the leading end of the dough is given free access between the brush and the table to preclude the bristles deforming the dough sheet.

As a still further object, the present invention aims to provide an assembly capable of using the rollers and frame of what is known in the bakery art as a breaking machine, a machine which, while at one time widely employed for developing the elasticity in dough, has been now largely discarded due to its toughening effect. In consequence of the ease with which this breaking machine may be converted to my sheeting usage the latter assembly is made available to bakers at a fraction of the figure which would be otherwise required.

The invention consists in certain novel features of construction and in the adaptation and combination of parts hereinafter described and claimed.

In the drawing:

Figure 1 is a longitudinal vertical sectional view representing a sheeting machine embodying the principles of the present invention, the view being somewhat diagrammatic in that the drive accommodations for the several driven parts are deleted for simplicity in illustration.

Fig. 2 is a fragmentary longitudinal vertical section representing the brush in the position which the same occupies as the leading end of the sheeted dough is fed below the same, the brush itself being indicated by dotted lines; and Fig. 3 is a diagrammatic view to a reduced scale illustrating the roller and belt lay-out of an ordinary breaking machine before converting the same for use as a sheeter.

According to the present invention I employ a frame-work of any suitable design having revolubly mounted at one end thereof for movement about horizontal axes a pair of vertically spaced live pressure rollers 5—6 arranged to rotate in opposite directions with the facing surfaces providing a sheeting gap into which the work is fed from a table 7. The said gap is governed as to its sheeting width through the instrumentality of shifting the roller 5 vertically.

Said roller 5, in addition to its sheeting office, functions as one terminal mounting for an endless belt 8, and the other terminal mounting therefore is provided by an idler roller 10 lying forwardly from the pressure rolls and in spaced relation above the free end of a flexible board 11' whose root end connects with and forms a part of a receiving table 11. Between the said rollers 5 and 10 the two runs of the belt pass, respectively, over an idler roller 12 and a live roller 13 each so located in relation to the terminal mountings as to have each of the belt-runs describe a substantial V-path. This live roller 13, as with the rollers 5 and 10, additionally functions as a support for a second endless belt 14 to thereby obtain a paralleling travel as between the two belts throughout a V-path which describes the lower run of the belt 8. From roller 10 such belt 14 rides the receiving table and at the forward limit of the latter is carried about a roller 15 from whence the same returns under the table to pass about an idler roller 16 located in such proximity to the sheeting gap of the rollers 5 and 6 that the two belts in the initiation of their paralleling travel produce a substantial prolongation of the gap. It is believed to be apparent that such paralleling travel functions to produce upon the introduced sheeted work $w$ a continuing pressure corresponding generally to that which is exerted by the rolls 5 and 6.

It may be here stated that the rollers 5, 6, 10, 13 and 16 are or may be in correspondence as to size and location with the rollers 5', 6', 10', 13' and 16' which characterize the customary breaking machine shown diagrammatically in Fig. 3, a machine in which the dough was repetitively introduced between the pressure rolls 5' and 6' and thence carried through the instrumentality of an endless belt b about the roller 5' to be thrown back upon the table 7'.

Of import to my machine in that it efficiently removes the excess flour which is applied to the surface of the dough body to prevent adherence to the belts is a brush 17 mounted above the receiving table and suitably driven in a direction converse to that of the belt 14. Characterizing this brush mounting, at each side of the table, is a standard 22 to which is pivoted, as at 21, a brush-supporting arm 20. Also supported by such standard with the shaft 21 forming a center fulcrum is a lever 24 of which one arm extends under and produces a rest for the brush shaft 18 and the other arm supports a roller 23. The arrangement is such that the roller 21 somewhat overbalances the weight of the brush and in its normal location rides the belt 14 to hold the brush out of the path of sheeted work conveyed by the belt. Progressive travel of the leading end of the work functions, however, by its engagement with the roller to raise the latter and in consequence lower the bristles of the brush into sweeping relation to the upper surface of the dough sheet. Augmenting gravity to influence the brush into engagement with the work is an extension spring 25 interconnecting the brush arm 20 with the lever 24. Believed to be clear is the deflectible nature of the brush to automatically accommodate the latter to differing sheeting widths within a limited compass, provision being made to adjust the roller in relation to the lever 24 where the elevation of the brush shaft out of its normal resting relation to the lever would be otherwise such as to exert an appreciable pressure from the spring 25 to the brush, it being understood that this spring is relatively weak.

It is of course apparent that the salient feature of the invention is the application of a continuing somewhat yielding pressure to sheeted dough throughout such period of time as will permit the elastic work to readjust itself to a flattened compass, various departures from the illustrated preferred embodiment to accomplish this end suggesting themselves without the exercise of invention.

What I claim, is:

1. In the art of sheeting dough: the combination of a pair of live pressure rollers complementing one another to produce a sheeting gap therebetween; a pair of driven endless belts extending, for a portion of their lengths, in spaced paralleling relation to one another from the discharge side of said sheeting gap and by the opening therebetween producing a traveling prolongation of the sheeting gap; and means serving as a median support for the paralleling runs of said belts and so located in offset relation to a rectilineal line projected between said sheeting gap and the discharge end of the prolongation thereof as to produce an angular relation as between the planes occupied by the belts in their travel to the median support and the planes occupied by the belts in their travel from said median support.

2. In the art of sheeting dough: a pair of driven endless belts extending, for a portion of their lengths, in spaced paralleling relation to one another for exerting compression pressure upon sheeted work carried between the same; a roller serving as a median support for the paralleling runs of said belts and so located in offset relation to a rectilineal line projected from the admission to the discharge end of said paralleling runs as to produce an angular relation as between the planes occupied by the belts in their travel to, and the planes occupied by the belts in their travel from, said supporting roller and means for feeding sheeted work between the belts.

3. In the art of sheeting dough: a pair of vertically spaced live pressure rollers complementing one another to produce a sheeting gap therebetween; a receiving table spaced therefrom; a driven endless belt extending from the sheeting gap to the receiving table for conveying the sheeted work to the latter; an idler roller supported above the conveyor belt at the admission end of the receiving table; a second endless belt passing at one end about the upper of said pressure rollers and at the other end about said idler roller and between said rollers paralleling the first-named belt in such spaced relation thereto as to describe a traveling prolongation of the sheeting gap; and a roller serving as a median support for the paralleling runs of said belts and by a location in offset relation to a rectilineal line projected from the sheeting gap to the table functioning to hold the belts relatively taut for maintaining compression pressure upon sheeted work carried between the belts to the table.

4. In the art of sheeting dough: a pair of driven belts providing sheeting runs paralleling one another for exerting compression pressure upon sheeted work carried between the same; and means serving as a support for said belts and located intermediate the end limits of said sheeting runs characterized in that the same is disposed in such offset relation to a rectilineal line projected between said end limits as to produce an angularity between the planes occupied by the belts in their travel to, and the planes occupied by the belts in their travel from, said intermediate support.

5. In the art of sheeting dough: a pair of travelling belts moving in unison and in spaced relation to produce an elongated gap to receive sheeted work, the belts acting to exert compression pressure upon the work in its travel with the belts; and means serving as a support for said belts and located intermediate the end limits of said elongated gap characterized in that the same is located in such offset relation to a rectilineal line projected between said end limits as to produce an angularity between the general plane occupied by the belts in their travel to, and the general plane occupied by the belts in their travel from, said intermediate support.

LE CONIE STILES.